(12) United States Patent
Jiang et al.

(10) Patent No.: US 10,451,104 B2
(45) Date of Patent: Oct. 22, 2019

(54) GAS BEARINGS

(71) Applicant: Birmingham High Performance Turbomachinery Limited, Moseley (GB)

(72) Inventors: Kyle Jiang, Moseley (GB); Guang Pu, Edgbaston (GB)

(73) Assignee: Birmingham High Performance Turbomachinery Limited, Moseley (GB)

( * ) Notice: Subject to any disclaimer, the term of this patent is extended or adjusted under 35 U.S.C. 154(b) by 0 days.

(21) Appl. No.: 15/766,683

(22) PCT Filed: Oct. 3, 2016

(86) PCT No.: PCT/GB2016/053060
§ 371 (c)(1),
(2) Date: Apr. 6, 2018

(87) PCT Pub. No.: WO2017/060679
PCT Pub. Date: Apr. 13, 2017

(65) Prior Publication Data
US 2018/0313402 A1 Nov. 1, 2018

(30) Foreign Application Priority Data
Oct. 8, 2015 (GB) .................................. 1517770.2

(51) Int. Cl.
*F16C 17/02* (2006.01)
*F16C 33/10* (2006.01)
(Continued)

(52) U.S. Cl.
CPC .......... *F16C 17/026* (2013.01); *F16C 17/045* (2013.01); *F16C 17/26* (2013.01);
(Continued)

(58) Field of Classification Search
CPC ...... F16C 17/026; F16C 17/045; F16C 17/26; F16C 33/1015; F16C 17/028; F16C 17/047; F16C 2360/24
See application file for complete search history.

(56) References Cited

U.S. PATENT DOCUMENTS 3,105,631 A * 10/1963 Hanny ..................... F01D 25/22
384/107
3,387,899 A * 6/1968 Hahn ...................... B24B 41/04
384/316
(Continued)

FOREIGN PATENT DOCUMENTS

CN 102066718 A 5/2011
CN 103026004 A 4/2013
(Continued)

OTHER PUBLICATIONS

International Search Report and Written Opinion received in International Application No. PCT/GB20161053060, dated Dec. 20, 2016, 10 pages.

*Primary Examiner* — Thomas R Hannon
(74) *Attorney, Agent, or Firm* — Adler Pollock & Sheehan P.C.

(57) ABSTRACT

A gas bearing system has at least one gas bearing (30, 32, 34) with a moving part and a static part and which can be operated in both aero-dynamic and aero-static modes. The system has a source (36) of pressurized gas fluidly connected with the bearing and a control system (134) for regulating the supply of pressurized gas to the bearing in dependence on the rotational speed of the moving part. The system has particular application in a turbocharger (1) where a flow of pressurized gas from the source is introduced into the bearing at the start-up and slow down phases of opera-
(Continued)

tion of the turbocharger, the flow being stopped, or reduced, when the turbocharger has reached normal operating speeds.

20 Claims, 6 Drawing Sheets

(51) Int. Cl.
  *F16C 17/04* (2006.01)
  *F16C 17/26* (2006.01)
(52) U.S. Cl.
  CPC ........ *F16C 33/1015* (2013.01); *F16C 17/028* (2013.01); *F16C 17/047* (2013.01); *F16C 2360/24* (2013.01)

(56) References Cited

U.S. PATENT DOCUMENTS

| | | | |
|---|---|---|---|
| 3,420,583 A * | 1/1969 | Hirs | F16C 17/026 384/113 |
| 3,517,973 A | 6/1970 | Hirs | |
| 3,951,474 A | 4/1976 | Hughes | |
| 4,366,993 A | 1/1983 | Ono | |
| 4,764,085 A * | 8/1988 | Jesinger | F04D 29/057 310/90.5 |
| 5,871,285 A * | 2/1999 | Wasson | F16C 17/026 384/118 |
| 8,075,190 B1 | 12/2011 | Wadehn | |
| 8,646,979 B2 * | 2/2014 | Kashchenevsky | F16C 33/1075 384/114 |
| 9,765,816 B2 * | 9/2017 | Sydnor | F16C 32/0666 |
| 2005/0249442 A1 * | 11/2005 | Sopper | F01D 25/168 384/121 |
| 2015/0003760 A1 * | 1/2015 | Van Mullem | F16C 32/0659 384/123 |
| 2016/0146248 A1 * | 5/2016 | Ertas | F16C 32/0622 384/105 |

FOREIGN PATENT DOCUMENTS

| | | |
|---|---|---|
| CN | 103846459 A | 6/2014 |
| JP | 2003089026 A | 3/1925 |
| JP | H08021435 A | 1/1996 |

\* cited by examiner

GAS BEARINGS

CROSS REFERENCE TO RELATED APPLICATIONS

This patent application claims priority to GB 1517770.2, filed on Oct. 8, 2015 and PCT/GB2016/053060, filed on Oct. 3, 2016, which is entirely incorporated herein by reference.

TECHNICAL FIELD OF THE INVENTION

The present invention relates to improvements in or relating to gas bearings and in particular, but not exclusively, in relation to gas bearings for use in turbochargers and the like. The invention also relates to turbochargers incorporating such gas bearings.

BACKGROUND TO THE INVENTION

Turbochargers are known which intake hot exhaust gases from an internal combustion engine and convert the energy contained within the exhaust gases to kinetic (rotational) energy by means of a turbine wheel mounted rotationally fast to a shaft. The rotational motion of the turbine wheel is transferred along the shaft to rotate a compressor wheel, which draws in and compresses air for delivery to the cylinders of the engine. The use of a turbocharger can considerably improve the overall efficiency of a combustion engine but it is important to keep energy losses in the turbocharger low. It is also an important design consideration for a turbocharger to respond quickly to exhaust gas flow and so reduce turbo lag and the various requirements have to be balanced for any given application.

It is known to use ceramic turbine wheels in a turbocharger. Turbine wheels made of ceramic material are preferred over wheels made of a metallic material, such as Inconel, due to the high temperature strength and relatively low density of ceramic materials. This allows use of the turbine wheel at elevated operating temperatures while the mass moment of inertia is reduced in comparison to an Inconel turbine wheel. Ceramic turbine wheels are lighter, have a higher strength, and are harder and more corrosion resistant than their Inconel equivalents. Use of a ceramic turbine wheel allows turbochargers to be designed which have the following advantages over a turbocharger having an equivalent Inconel turbine wheel:
  more rapid response, reducing turbo lag;
  ability to work at a lower engine speed, which helps cutting emissions of vehicles in urban area where cars do not move fast but produce high emissions;
  ability to run faster, which allows a turbocharger to be reduced in size for a given flow rate;
  longer lasting.

It is common to employ a bearing system to support a rotating shaft, such as the connecting shaft in a turbocharger. In a known arrangement, the bearing system comprises radial sleeve or journal bearings for supporting rotary loads and an axial thrust bearing. In an effort to reduce friction losses and to increase speed of response, it is known to adopt non-contact bearings including fluid bearings and more particularly gas and especially air bearings.

In a gas bearing, a thin film of pressurised gas provides a very low friction load bearing interface between the relatively moving surfaces. There are two main types of gas bearing, gas-static (aero-static) and gas-dynamic (aero-dynamic). In a gas-static bearing, pressurised gas is supplied from an external source, usually a pump, compressor or compressed gas reservoir, to form the load bearing layer. In a gas-dynamic bearing, relative movement between the surfaces of the bearing is used to generate the supportive layer with no external supply of pressurised gas.

Use of gas bearings in a turbocharger offers a number of advantages when compared with an equivalent turbocharger using conventional oil bearings. These include:
  more rapid response, reducing turbo lag;
  ability to run faster, which allows a turbocharger to be reduced in size for a given flow rate;
  increase in output power of the compressor, i.e. more power is recycled back to boost the engine;
  cleaner due to absence of oil, no leakage or additional pollution caused by burning oil;
  reduction in fuel consumption and emissions, particularly when cars travel at medium speed in urban areas.

A problem with gas-dynamic bearings is that at low speeds the pressure generated in the layer of gas may be insufficient to support the load, resulting in contact between the parts of the bearing. In this event, friction is increased dramatically reducing the efficiency of the system, but also possibly causing damage through wear and tear of the parts of the bearing contacting each other. Gas-static bearings avoid this problem by using an external source to supply pressurised gas regardless of the speed of rotation. However, known systems for delivering pressurised gas for use in gas-static bearings tend to be rather bulky and so are unsuitable for use in mobile applications such as a motor vehicle, where space and weight limitations are significant. The external source for supplying pressurised gas also consumes energy, reducing the overall efficiency of the system There is need to provide a gas bearing arrangement which overcomes, or at least mitigates, the problems of the known gas bearings.

There is a need in particular for an improved gas bearing arrangement suitable for use in a turbocharger which overcomes, or at least mitigates, the problems of the known gas bearings and for a turbocharger incorporating such an arrangement.

SUMMARY OF THE INVENTION

According to a first aspect of the present invention, there is provided a gas bearing system comprising at least one gas bearing having a moving part and a static part, the parts having opposed surfaces separated by a gap, the at least one bearing being configured to generate a layer of pressurised gas in the gap due to gas-dynamic effects in response to relative movement between the moving and static parts, the system also comprising a source of pressurised gas fluidly connected with the at least one bearing to deliver pressurised gas into the gap, and a control system for regulating the supply of pressurised gas to the at least one gas bearing in dependence on the rotational speed of the moving part.

The control system may be configured such that, in use, pressurised gas from the source is supplied to the bearing at all times whilst the moving part is rotating, the flow of the pressurised gas being lower at higher rotational speeds of the moving part than at lower rotational speeds.

The control system may be configured such that, in use, pressurised gas from the source is supplied to the bearing at a higher rate when the moving part rotates at speeds below a first threshold speed than when the moving part rotates at speeds at or above the first threshold speed.

The control system may be configured such that, in use, pressurised gas is supplied to the bearing only when the moving part rotates at a speed below a first threshold rotational speed.

The source of pressurised gas may comprise a mechanism for pressurising a gas, the control system being configured to regulate actuation of the mechanism to supply pressurised gas. Where the control system is configured such that, in use, pressurised gas is supplied to the bearing only when the moving part rotates at a speed below a first threshold rotational speed, the control system may be configured to actuate the mechanism to supply pressurised gas when the moving part is rotating below the first threshold rotational speed and to stop actuation of the mechanism when the moving part is rotating at or above the threshold rotational speed. The mechanism may be a pump or compressor.

The control system may have a sensor arrangement for sensing (directly or indirectly) rotational movement of the moving part. The control system may have means for determining the rotational speed of the moving part.

A plurality of restrictors may be provided in the static part for admitting pressurised gas in to the gap from the external source, the restrictors being fluidly connected with the source of pressurised gas.

At least one of the opposed surfaces may be profiled to assist in the dynamic generation of a layer of pressurised gas in the gap in response to relative movement between the opposed surfaces.

The at least one bearing may include at least one journal bearing, the static part comprising a tubular sleeve and the moving part comprising a journal surface of a shaft located within the sleeve, the sleeve having a plurality of restrictors for admitting pressurised gas from the source into the gap between the journal and the sleeve. In an embodiment, a plurality of grooves are spaced circumferentially about the journal surface for dynamically generating a layer of pressurised gas in the gap, the grooves each having a leading edge, a trailing edge, and a bottom surface. The grooves may be arranged in two rows axially spaced apart by a central land portion, each groove having an inner edge proximal to the land portion and an outer edge distal from the land portion, the inner edge being offset circumferentially behind the outer edge relative to the intended direction of rotation of the journal surface.

The at least one gas bearing may include at least one thrust bearing, the moving part comprising a pair of spaced rotary members and the static part comprising a plate mounted between the members so that a first gap is provided between opposed surfaces of the plate and a first of the members and a second gap is provided between opposed surfaces of the plate and the other of the members, the plate including a plurality of restrictors and flow channels for admitting pressurised gas from the source into both gaps. In an embodiment, the opposed surface of each of the rotary members has a set of grooves spaced circumferentially about a radially outer region, each groove having leading edge, a trailing edge, a radially outer edge, a radially inner edge, and a bottom surface, the radially inner edge of each groove being offset circumferentially behind the radially outer edge relative to the intended direction of rotation of the members.

Where the moving surface of a bearing has grooves to produce an aero-dynamic effect, the bottom surface of at least one of the grooves may be curved so that the depth of the groove varies in a direction between its leading edge and its trailing edge. In an embodiment, the bottom surface curves from the trailing edge towards the leading edge such that the groove is deeper at the leading edge than the trailing edge. In an alternative embodiment, the bottom surface curves from the leading edge towards the trailing edge such that the groove is deeper at the trailing edge than the leading edge. In a further embodiment, the bottom surface has a generally u-shaped concave curve, being deeper in a central region between the leading and trailing edges than at the leading and trailing edges.

The bearing system may include at least one journal bearing and at least one thrust bearing.

The gas may be air.

In accordance with a second aspect of the invention, there is provided a turbocharger having a housing, a turbine wheel connected with a compressor wheel by means of a shaft, the shaft being supported in the housing by a bearing system in accordance with the first aspect of the invention. The bearing system may include a journal bearing as set out above in relation to the first aspect of the invention, wherein the journal surface is part of the surface of the turbocharger shaft. The bearing system may include a thrust bearing as set out above in relation to the first aspect of the invention, in which the rotary members are mounted rotationally fast with the turbocharger shaft.

The control system may be configured in use to introduce pressurised gas into the gap between the moving and static part of the, or each, gas bearing during start up and slow down phases of operation of the turbocharger and to stop, or reduce, the flow of the pressurised gas when the turbocharger has reached a normal operating speed.

In accordance with a third aspect of the invention, there is provided a method of operating a turbocharger in accordance with the second aspect of the invention, the method comprising using the control system to regulate the supply of pressurised gas from the source to the, or each bearing, as a function of the speed of rotation of the moving part. The method may comprise introducing pressurised gas from the source into the gap between the moving and static part of the, or each, gas bearing during start up and slow down phases of operation of the turbocharger and to stop, or reduce, the flow of the pressurised gas when the turbocharger has reached normal operating speeds.

In accordance with a fourth aspect of the invention, there is provided a hybrid static/dynamic gas bearing comprising a static part and a moving part, the static and moving parts having opposed surfaces with a gap in-between, the static part having a plurality of restrictors for introducing a pressurised gas into the gap from an external source, the opposed surface of the moving part being profiled to dynamically generate a layer of pressurised gas in the gap in response to relative movement between the opposed surfaces.

The opposed surface of the moving part may comprise a plurality of grooves, each groove having a leading edge, a trailing edge and a bottom surface which is curved to vary the depth of the groove between the leading edge and the trailing edge. In an embodiment, the bottom surface curves from the trailing edge towards the leading edge such that the groove is deeper at the leading edge than the trailing edge. In another embodiment, the bottom surface curves from the leading edge towards the trailing edge such that the groove is deeper at the trailing edge than the leading edge. In a further embodiment, the bottom surface is generally u-shaped being deeper in a central region between the leading and trailing edges than at the leading and trailing edges.

The bearing may be a journal bearing, the static part comprising a tubular sleeve and the moving part comprising a journal surface of a shaft located within the sleeve, the sleeve having a plurality of restrictors through which pressurised gas is introduced into the gap between the journal and the sleeve. In which case, the plurality of grooves may be spaced circumferentially about the journal surface. In an embodiment, the grooves are arranged in two rows axially spaced apart by a central land portion of the journal surface, each groove having an inner edge proximal to the land portion and an outer edge distal from the land portion, the inner edge being offset circumferentially behind the outer edge relative to the intended direction of rotation of the journal surface. The restrictors may be circumferentially spaced about the sleeve opposite the land portion.

The bearing may be a thrust bearing, the moving part comprising a pair of spaced rotary disc-like members and the static part comprising a plate mounted between the members so that a first gap is provided between opposed surfaces of the plate and a first of the members and a second gap is provided between opposed surfaces of the plate and the other of the members, the plate including a plurality of restrictors and flow channels through which pressurised gas from the source is introduced into both gaps. In the case of a thrust bearing, the opposed surface of each of the rotary members may have a set of said grooves spaced circumferentially about a radially outer region, each groove having a radially outer edge and a radially inner edge, the radially inner edge of each groove being offset circumferentially behind the radially outer edge relative to the intended direction of rotation of the members.

The gas may be air.

The hybrid static/dynamic gas bearing in accordance with the fourth aspect of invention may be suitable for use in the gas bearing system according to the first aspect of the invention and/or in a turbocharger in accordance with the second aspect of the invention.

DETAILED DESCRIPTION OF THE INVENTION

In order that the invention may be more clearly understood embodiments thereof will now be described, by way of example only, with reference to the accompanying drawings, of which.

Figure 1:
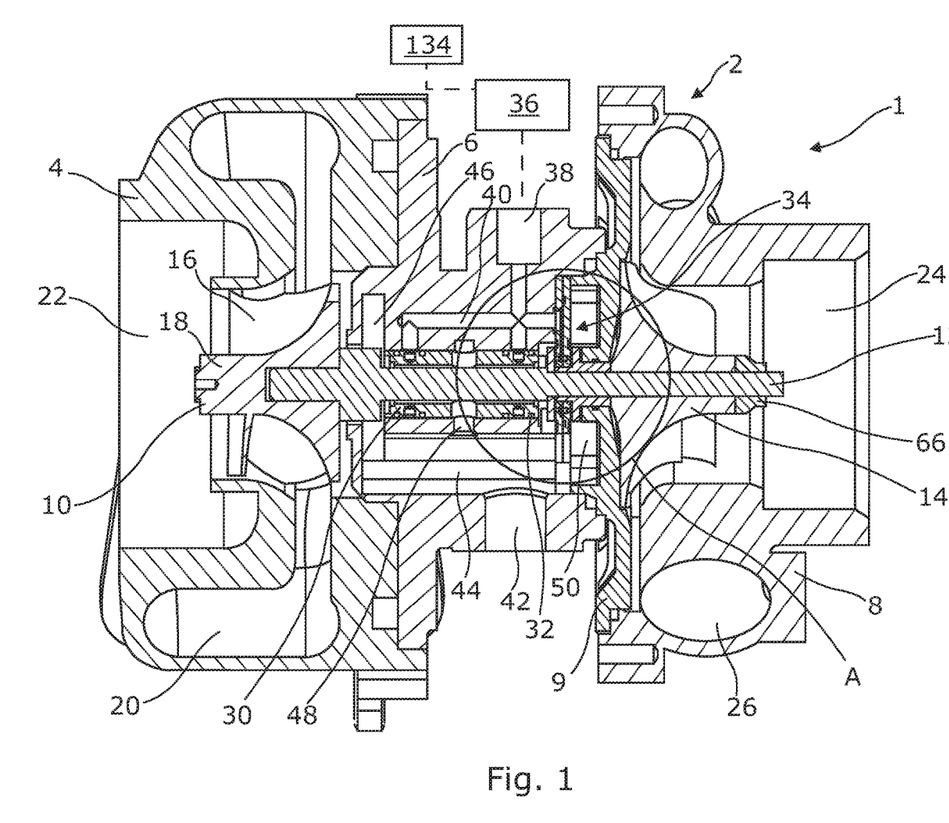
FIG. 1 is a cross sectional view of an embodiment of a turbocharger in accordance with an aspect of the present invention.
Figure 2:
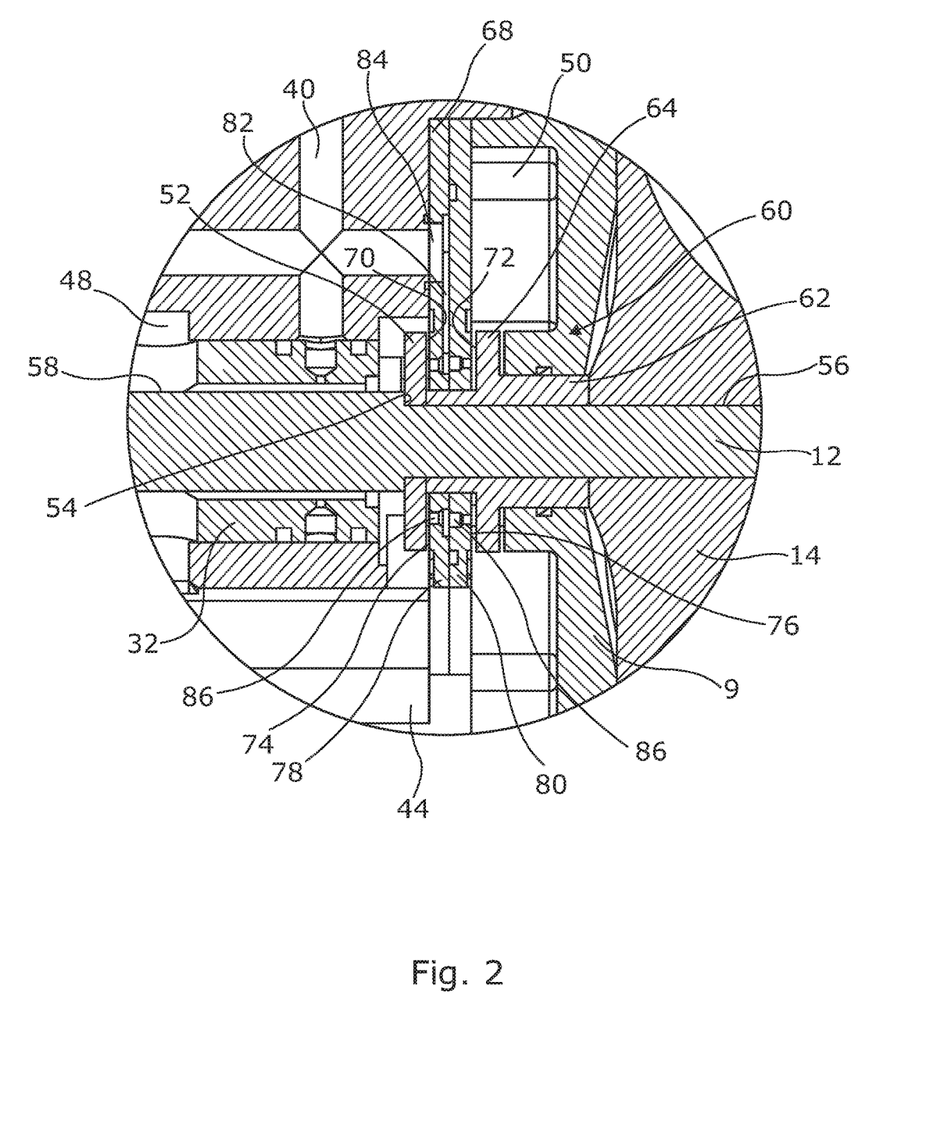
FIG. 2 is an enlarged view of detail "A" in FIG. 1.

FIGS. 1 and 2 illustrate an embodiment of a turbocharger 1 in accordance with an aspect of the invention. The turbocharger is intended for use with an associated internal combustion engine (not shown) which would typically be mounted in a motor vehicle, though it may have other applications. The turbocharger 1 has a housing 2 which includes a turbine housing section 4, a central housing section 6, a compressor housing section 8, and a back cover 9 for the compressor housing section. Mounted within the housing 2 are the working parts of the turbocharger 2 including: a turbine wheel 10, a connecting shaft 12, and a compressor wheel 14.

Figure 3:
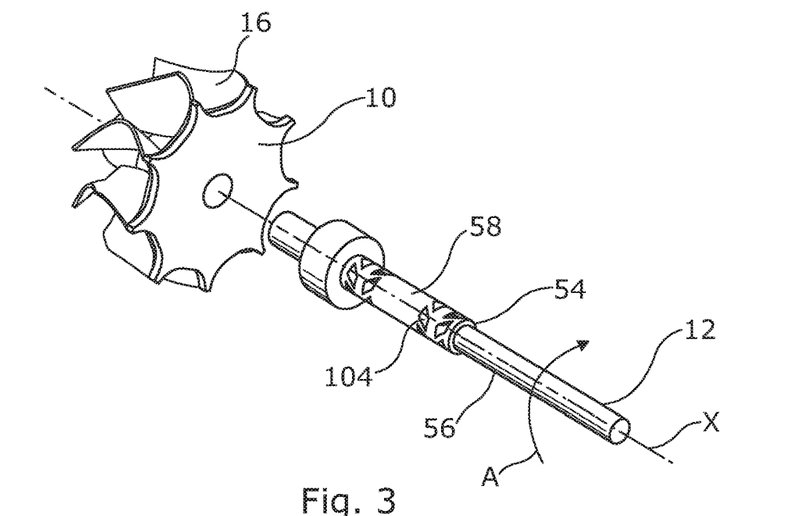
FIG. 3 is an exploded perspective view of a turbine wheel and shaft assembly forming part of the turbocharger shown in FIG. 1.

The turbine housing section 4 is mounted to one side of central housing section 6 and surrounds the turbine wheel 10. The turbine wheel 10 includes a series of turbine blades 16 disposed about a central hub 18. The turbine wheel can be made of any suitable material including metallic materials such as Inconel but is advantageously made of a ceramic material and could be made of Si3N4 or its alloy. The turbine wheel 10 is mounted rotationally fast to a first end of the shaft 12 for co-rotation about a longitudinal axis X of the shaft 12. In the present embodiment, the turbine wheel and shaft rotate in the direction indicated by arrow A in FIG. 3 during normal operation of the turbocharger.

In this specification, references to "leading" and "trailing" in relation to features of the turbine wheel 10, shaft 12, and any other component mounted rotationally fast with the shaft should be understood as referring to the relative disposition of the feature when the shaft is rotating in the direction of arrow A, unless otherwise specified.

The turbine housing section 4 defines an exhaust gas inlet 20 for directing exhaust gases from the associated combustion engine onto the blades 16 of the turbine wheel 10 and an exhaust gas outlet 22. In use, the exhaust gas outlet will be fluidly connected to a vehicle exhaust system (not shown) in the usual manner.

The compressor wheel 14 is mounted rotationally fast to a second end of the shaft 12. The compressor wheel is housed between the back cover 9, which is attached to the opposite side of the central housing portion 6 from the turbine, and the compressor housing section 8 which is mounted to the back cover 9. The compressor housing section 8 defines an air inlet 24 and a compressed air outlet 26. Rotation of the compressor wheel 14 as it is driven by the turbine wheel 10 draws in ambient air through the inlet 24, which air is compressed and expelled through the outlet 26. In use, the outlet 26 is connected to an inlet manifold (not shown) of the associated combustion engine for directing the compressed air in to the cylinders of the associated combustion engine in the usual manner.

The shaft 12 passes through the central housing section 6 and the back cover 9 and is rotatably supported by an air bearing system in accordance with an aspect of the invention. The air bearing system includes a pair of journal, sleeve bearings 30, 32 in the central housing portion for supporting rotary loads and an axial thrust bearing 34 located between the central housing portion 6 and the back cover 9.

The air bearing system is a hybrid system in which the bearings 30, 32, 34 are designed to operate exclusively or primarily as aero-dynamic bearings at higher rotational speeds of the shaft 12 whilst an external source (indicated schematically at 36) is used to supply pressurised air to the bearings 30, 32, 34, at least when the shaft is rotating at lower speeds at which the aero-dynamic effect cannot be fully relied upon to support the working loads. In some applications, the bearings 30, 32, 34 will be operated exclusively as aero-dynamic bearings at higher rotational speeds with the external source 36 used to supply pressurised air only at lower speeds. However, in some applications a reduced supply of pressurised air may be provided from the external source 36 even at higher rotational speeds. This hybrid system combines the benefits of aero-static and aero-dynamic air bearings ensuring the working loads are adequately supported at all rotational speeds of the shaft whilst reducing the adverse affect on the overall efficiency of the turbocharger of using an external source of pressurised air.

The central housing section 6 defines a compressed air inlet manifold 38 to which the source of pressurised air is attached. A series of passageways 40 in the central housing section direct pressurised air from the inlet manifold 38 to the air bearings 30, 32, 34. Air escaping from the boundary of the air bearings is exhausted by means of an air exhaust system which includes an air outlet manifold outlet 42 defined in the central housing portion on the opposite side from the inlet manifold 38. A first, main air flow release chamber 44 fluidly connected with the outlet manifold 42 is defined in the central housing portion and extends longitudinally over the majority of the length of the central housing portion. Second and third air flow release chambers 46, 48 are defined in the central housing portion and a fourth air flow release chamber 50 is defined in the back cover 9 of the compressor wheel. The second, third and fourth air flow release chambers 46, 48, 50 each surround the shaft 12 and are fluidly connected with the main air flow release chamber 44 to create flow paths which allow air coming out of the boundary of the air bearings 30, 32, 34 to enter the main air flow release chamber 44 and exit through the outlet manifold 42. The second, third and fourth air flow release chambers 46, 48, 50 are distributed along the length of the shaft 12 with the second air flow release chamber 46 being located at the turbine end adjacent a first of the journal bearings 30, the third air flow release chamber 48 centrally located between the two journal bearings 30, 32 and the fourth air flow release chamber 50 being located at the compressor end adjacent the thrust bearing 34.

Details of the axial thrust bearing 34 can be seen best from FIG. 2. The thrust bearing 34 supports the axial loading of the shaft 12 and also locates the shaft axially in the housing 2. The thrust bearing 34 includes a disc like annular bearing pad 52 mounted rotationally fast to the shaft 12 and which forms a first moving part of the thrust bearing. The bearing pad 52 is located in abutment with a radial shoulder 54 of the shaft between a smaller diameter portion 56 of the shaft to which the compressor wheel 14 is mounted and a larger diameter portion 58 which is supported by and forms part of the journal bearings 30, 32. A thrust collar 60 is also mounted rotatably fast with the shaft 12. The thrust collar 60 has a cylindrical tubular body 62 which is mounted to the shaft 12. The body 62 has a stepped cylindrical outer surface and a radial flange 64 projecting radially outwardly from the body 62. The flange 64 is axially spaced from the pad 52 and forms a second moving part of the thrust bearing. The bearing pad 52 and the radial flange 64 of the thrust collar have substantiality the same outer diameter.

The bearing pad 52 and thrust collar 60 are clamped in position on the shaft 12 between the radial shoulder 54 and a rear surface of the compressor wheel 14, which abuts an end of the cylindrical body 62 of the thrust collar 60. The compressor wheel 14 is slidably mounded to the smaller diameter portion 56 of the shaft by means of splines on the shaft which engage in corresponding grooves in the wheel 14. A nut 66 is screwed on to the end of the shaft 12 and clamps the compressor wheel 14 against the thrust collar 60, which in turn clamps the bearing pad 52 against the radial shoulder 54.

A stationary part the thrust bearing 34 is in the form of a plate 68. A first end region of plate 68 is mounted between an end face of the central housing portion 6 and the back cover 9 of the compressor wheel housing. A second end region of the plate 68 extends between opposed radially extending surfaces 70, 72 of the pad 52 and the flange 64 of the thrust collar. A hole is provided in the plate 68 through which a part of the cylindrical body 62 of the thrust collar projects. Opposing side surfaces 74, 76 of the plate 68 oppose in closely spaced relation the radially extending surfaces 70, 72 of the pad 52 and the radial flange 64 respectively. The plate 68 is made in two halves, a first half part 78 and a second half part 80 which are joined together along mating surfaces. The mating surfaces are profiled define an air flow channel 82 for delivering pressurised air to the thrust bearing. The channel 82 is fluidly connected at one end with an inlet aperture 84 through the first half part 74 and through which pressurised air is able to enter the channel 82 from the air inlet passageway 40. The air flow channel 82 is also fluidly connected with restrictors 86 extending through each of the half parts 78, 80 to direct pressurised air into the gaps between opposing surfaces 70, 72, 74, 76 of the plate 68, the pad 52 and radial flange 64 at a controlled rate. The restrictors may be small orifices or they may comprise an insert of porous material though which the pressurised air can flow at a controlled rate. Location of the plate 86 between the bearing pad 52 and the radial flange 68 locates the shaft 12 axially in the housing 2.

Figure 4:
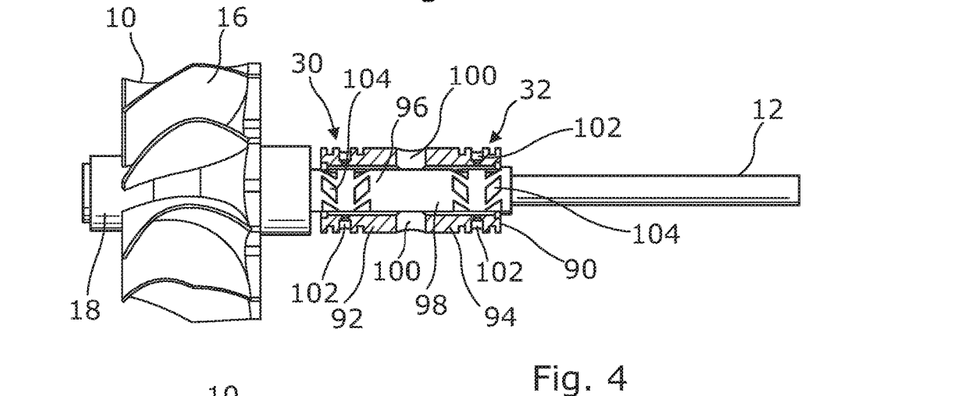
FIG. 4 is a side view, partially sectioned, of the turbine wheel and shaft assembly of FIG. 2, illustrating mounting of the shaft in a radial air bearing.
Figure 5:
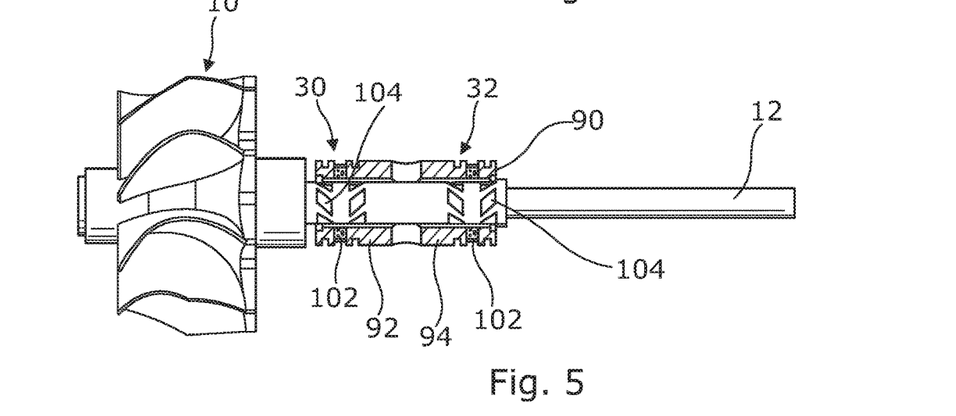
FIG. 5 is view similar to that of FIG. 4 but showing a variant of the bearing arrangement.
Figures 6, 7:
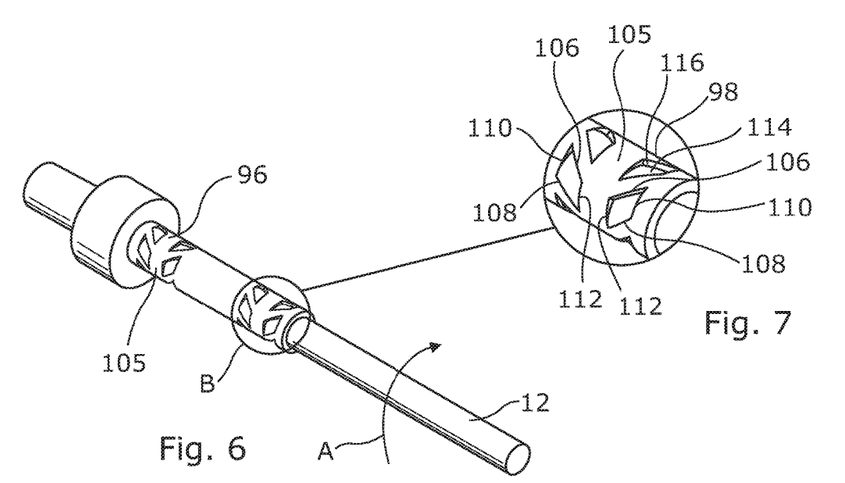
FIG. 6 is a perspective view of the shaft forming part of the assembly of FIGS. 4 and 5.
FIG. 7 is an enlarged view of detail "B" in FIG. 6.
Figure 8:
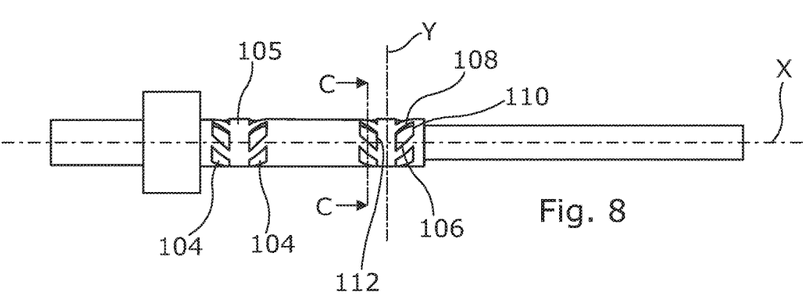
FIG. 8 is a side elevation of the shaft of FIG. 6.
Figure 9:
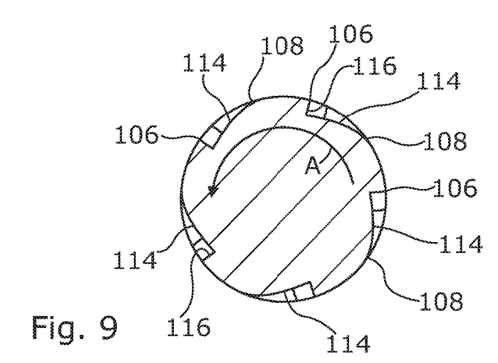
FIG. 9 is a cross sectional view on an enlarged scale of the shaft shown in FIG. 6 taken through line C-C.

FIGS. 4 and 5 illustrate embodiments of the radial, journal bearings 30, 32 which form a translational part of the air bearing system. The journal bearings 30, 32 share a common stationary cylindrical sleeve 90 which lies concentric about the shaft 12 and is divided into two sleeve portions 92, 94, one for each bearing. Each bearing 30, 32 also comprises a journal portion 96, 98, each of which is part of the outer surface of the shaft 12 that locates within the respective sleeve portion 92, 94 and forms the rotary moving part of the bearing. Radial bores 100 extend through the sleeve between the two sleeve portions 92, 94 to allow air to pass from the inner edges of the bearings into the third air flow release chamber 48. Each sleeve portion 92, 94 has a series of restrictors 102 spaced circumferentially through which pressurised air is introduced at a controlled rate into the gap between the sleeve portion and its respective journal portion 96, 98. The restrictors 102 are fluidly connected with the pressurised air inlet passageway 40 and may take the form of orifices as illustrated in FIG. 4 or a porous insert as illustrated in FIG. 5. Whilst the sleeve portions 92, 94 are formed as part of a common sleeve 90, it will be appreciated that the sleeve portions could be provided as separate sleeve members instead.

The bearings 30, 32, 34 are all adapted to produce an aero-dynamic effect to generate the pressurised film of air to support the working loads, at least when the turbocharger shaft is rotating at, or close to, its normal operating speed. FIGS. 3 to 9 illustrate a first embodiment of the hybrid journal bearings 30, 32 including the features that are adapted to generate the aero-dynamic effect. For convenience, the details of one of the journal bearings 32 will be described but it will be appreciated that the description applies equally to the other bearing 30.

The bearing 32 is designed to enhance lift and reduce friction at low rotating speeds and to make use of the dynamic effect of the fluid film to provide lift when the rotary speed of the shaft 12 is sufficiently high. In order to enhance the dynamic effect, a series of grooves 104 are formed on the surface of the journal portion 98.

The grooves 104 in the journal portion 98 are arranged in two adjacent circumferential rows which locate one on either side of a centre line Y at the axial mid-point of bearing journal portion 98. In this first embodiment, there are five grooves 104 in each row, spaced circumferentially about the journal surface. Each groove 104 is relatively shallow and has a generally rectangular shape in plan with a leading side edge 106, a trailing side edge 108, an outer end edge 110, an inner end edge 112 proximal the centre line Y of the bearing, and a bottom surface 114 between the edges. The side edges 106, 108 of the grooves are angled relative to the longitudinal axis X of the shaft such that the inner end edges 112 of the grooves are circumferentially offset behind (or trailing) the outer end edges 110 when considered in relation to the direction of rotation of the shaft 12 as indicated by the arrow A. This results in the two rows of grooves forming a herring bone type pattern. The two rows of grooves 104 are spaced apart by a circumferential land portion 105 in which there are no grooves. Whilst there are five grooves 104 in each row in this embodiment, the number of grooves can be varied and could be more or less than five.

Angling the grooves 104 relative to the longitudinal axis so that their inner ends 112 are offset circumferentially behind or trailing their axially outer ends 110 results in the grooves 104 directing or pumping air axially inwardly towards the land portion 105 in the centre of the bearing as the shaft rotates in the direction of arrow A. The use of two rows of grooves in a herring bone pattern means that both sets of grooves contribute to movement of air towards the axial centre of the bearing where the land portion 105 is located.

The moving parts of the axial thrust bearing 34 are also provided with profiling to generate an aero-dynamic effect at higher rotational speeds. The profiling takes the form of a series of grooves distributed about the opposed radially extending surfaces 70, 72 of the bearing pad 52 and the flange 64 of the thrust collar 60 as illustrated in FIGS. 12 to 15.

Figure 12:
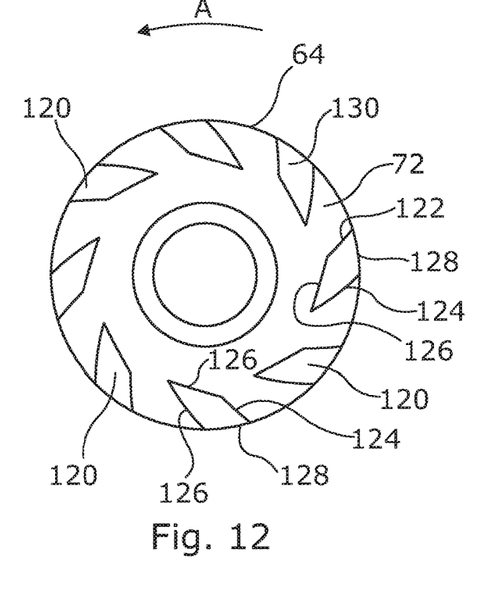
FIG. 12 is an end view of a thrust collar forming part of a thrust bearing of the turbocharger of FIG. 1.
Figure 13:
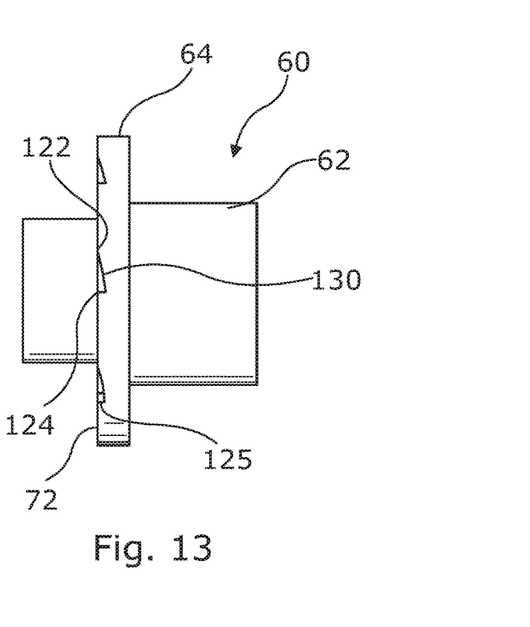
FIG. 13 is a side view of the thrust collar of FIG. 12 illustrating a profile used in a set of aero-dynamic grooves formed in a face of the thrust collar.

With reference to FIGS. 12 and 13, a set of grooves 120 are formed about an outer circumferential region of the radially extending surface 72 of the flange 64 of the thrust collar 60. In the present embodiment, there are eight grooves but there could be fewer or more than eight. Each groove 120 extends radially inwardly from the outer circumference of the flange 64 and has a leading side edge 122, a trailing side edge 124, a closed inner end edge 126 and an outer end edge 128 where the groove breaks through the outer circumference of the flange. The grooves are relatively shallow, each having a bottom surface 130 between the side edges. The side edges 122, 124 of the grooves are angled relative to a radial direction of the flange 64 so that the inner end edges 126 are circumferentially offset behind (or trailing) the outer end edges 128 when considered in relation to the direction of rotation of the flange 64, which rotates together with the shaft in the direction of arrow A.

Figure 14:
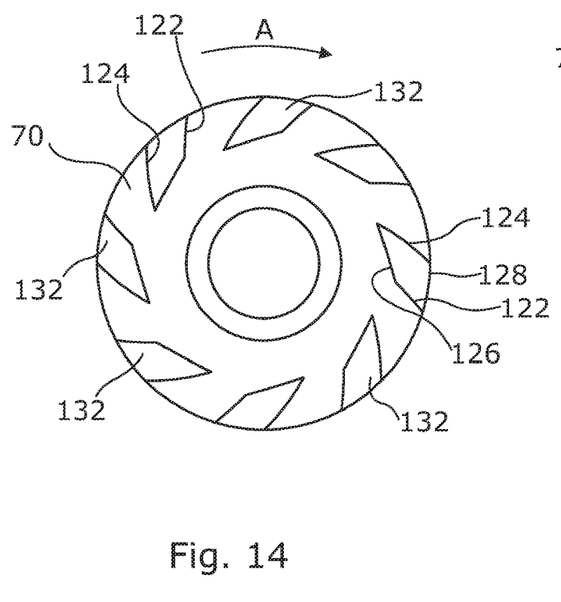
FIG. 14 is an end view of a bearing pad forming part of a thrust bearing of the turbocharger of FIG. 1.
Figure 15:
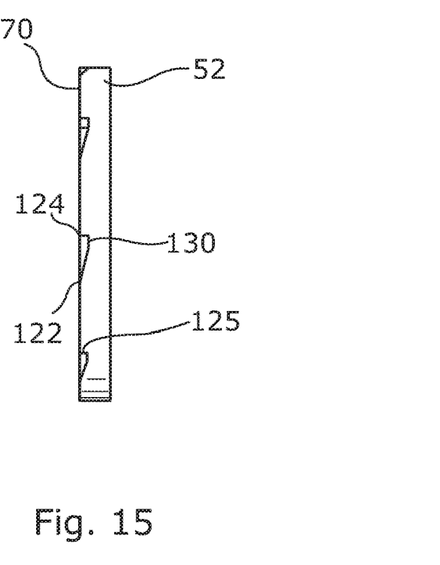
FIG. 15 is a side view of the bearing pad of FIG. 14 illustrating a profile used in a set of aero-dynamic grooves formed in a face of the bearing pad.

A corresponding set of grooves 132 is formed on a radially outer region of the radially extending surface 70 of the bearing pad 60 as illustrated in FIGS. 14 and 15. The grooves 132 in the surface 70 of the bearing pad are a mirror image of the grooves 120 in the face 72 of the flange 64 of the thrust pad and so will not be described in detail. The description of the grooves 120 in the flange 64 applies mutatis mutandis to the grooves 132 in the bearing pad.

Angling of the grooves 120, 132 so that their inner end edges 126 trail the outer end edges results in the grooves directing or pumping air radially inwards to towards the radial centre of the bearing as the flange 64 and bearing pad 52 rotate in the direction of arrow A together with the shaft.

At the normal rotational speed of the turbocharger, which may be in the range of 100K rpm to 320 k rpm depending on the size of the engine and the diameter of the compressor wheel, a high pressure film of air is dynamically generated in the journal bearings 30, 32 due to the drag between the rotating journal portion 96, 98 and the static sleeve portion 92, 94 and the presence of the grooves 104 as the journal portion rotates within the sleeve portion. Similarly, in the thrust bearing 34, high pressure films of air are generated in the gap between the bearing pad 52 and the plate 68 and in the gap between the flange 64 and the plate 68 due to the drag between the rotating and static parts and the presence of the grooves 120, 132 as the bearing pad 52 and flange 64 rotate relative to the plate 68. Thus at, or close to, the normal operating speeds of the turbocharger, the bearings 30, 32, 34 are able to operate predominantly or exclusively as aero-dynamic bearings. However, at least during periods of operation as the turbocharger gets up to speed and as it slows down at the end of each activation when the dynamic effect of the bearings may be insufficient to support the working loads, pressurised air is supplied from the external source 36 through the restrictors 86, 102 to ensure that there is no contact between the moving and static parts. During these phases of operation, the bearings work predominantly as aero-static bearings. As noted, in some circumstances a reduced flow of pressurised air from the source 36 can be maintained even when the turbocharger has reached its normal operating range. This has been found to be advantageous in increasing the load capacity of a bearing whilst still reducing the amount of pressurised air that must be supplied in comparison with a standard aero-static bearing system.

It will be noted that the restrictors 102 in the sleeve portion 94 are aligned with the land portion 105 so that the pressurised air entering through the restrictors is directed on to the land portion. Similarly, the restrictors 86 in the plate 68 are located radially inboard of the grooves 120, 120 so as to direct pressurised air on to un-grooved land portions of the these surfaces.

Whilst the angle or pattern of the grooves 104, 120, 132 determines the direction that air is pumped when the shaft rotates, it has also been found that curving the bottom surface 114, 130 of the grooves affects the load capacity and power loss in a bearing when operating aero-dynamically.

As illustrated in FIGS. 6 to 9, in the first embodiment of the grooves 104 in the journal bearings, each groove 104 has a convexly curved bottom surface 114 which curves radially inwardly from a trailing side edge 108 of the groove towards a stepped side surface 116 at the leading side edge 106. The grooves 104 are thus deeper at their leading side edges 106 getting progressively shallower towards their trailing side edges 108. This will be referred to as curvature option 1. It has been found that for an otherwise equivalent bearing arrangement, curving the bottom surfaces 114, 130 of the grooves 104, 120, 132 according to curvature option 1 results in the bearing having a lower load capacity and lower power loss than would be the case if the grooves had a flat bottom surface 114, 130.

In contrast, the bottom surfaces 130 of the grooves 120, 132 in the thrust bearing as shown in FIGS. 13 and 15 are curved in the opposite direction so as to get progressively deeper from their leading side edge 122 towards their trailing side edge 124 where there is a stepped side surface 125. This will be referred to as curvature option 2. It has been found that curving the bottom surfaces 114, 130 of the grooves 104, 120, 132 according to curvature option 2, increases the power load capacity of the bearing when compared to an equivalent bearing in which the grooves have a flat bottom but at the expense of increased power consumption.

By varying the direction and degree of curvature of the bottom surfaces of the grooves, the ratio of load capacity and power loss of the bearing can be varied, at least to some extent. In the present embodiment, the bottom surfaces 114 of the grooves 104 in the journal bearings 30, 32 are curved according to curvature option 1 so that the grooves are deeper at the leading edge than the trailing edge in order to minimise power loss. This has the advantage of reducing turbo lag. In contrast, as the size of the thrust bearing 34 is limited, the grooves 120, 132 in the thrust bearing are curved according to curvature option 2 in order to increase the load capacity of the bearing but at the expense of greater power loss.

It will be appreciated that the profiles of the bottom surfaces 114, 130 could be varied from those shown to provide a desired compromise between load capacity and power loss for any given application. For example, in the journal bearings 30, 32, the bottom surfaces 114 of the grooves 104 could be profiled according to curvature option 2 in the event that greater load capacity is desired and similarly the bottom surfaces 130 of grooves 120, 132 in the thrust bearing could be profiled according to curvature option 1 in the event that minimising power loss is of primary concern.

Figure 10:
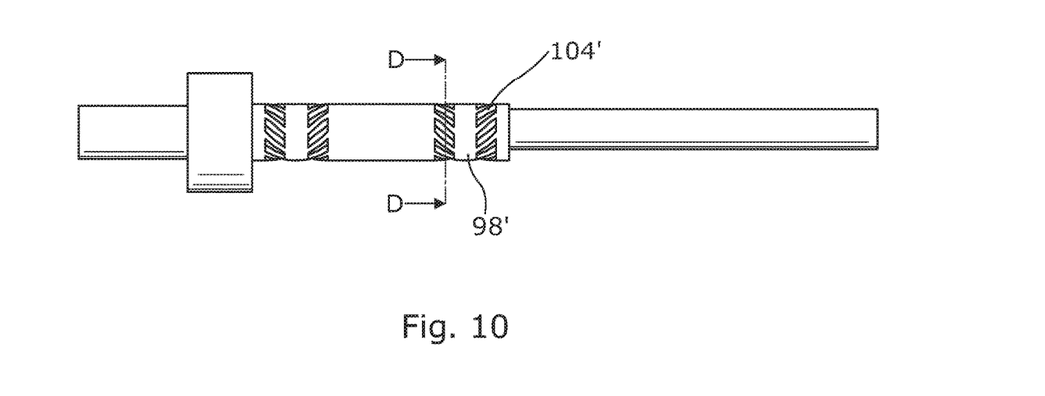
FIG. 10 is a side elevation view similar to that of FIG. 8 but showing an alternative embodiment of a shaft.
Figure 11:
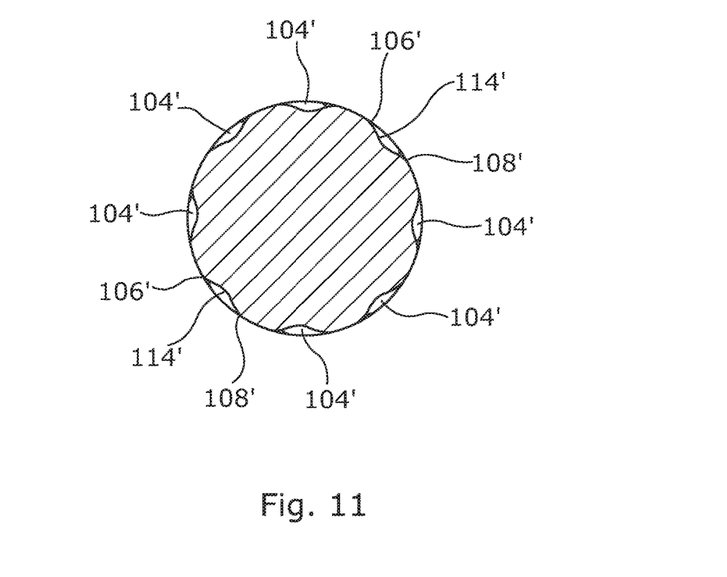
FIG. 11 is a cross sectional view on an enlarged scale of the shaft of FIG. 10 taken through the line D-D.

Curving the bottom surfaces of the grooves to fine tune the load capacity/power loss of an air bearing is not limited to use of curvature options 1 and 2 as described above and other curved profiles could be adopted for the bottom surfaces. The choice of groove configuration may depend on a number of factors including the speed at which the turbocharger 2 will run during normal use. A range of curved groove profiles can be tested using computational fluid flow dynamics (simulation) and the most appropriate selected. For example, FIGS. 10 and 11 show a slightly different configuration of the grooves 104' for use in the journal bearings 30, 32. In this embodiment there are eight grooves 104' in each row and each groove 104' has a concave bottom surface 114' which curves radially inwardly from the leading side edge 106' towards a centre of the groove and then curves radially outwardly towards the trailing side edge 108' so that grooves have a generally shallow U shaped profile in the bottom surface 114' when viewed in a lateral cross section of the shaft as shown in FIG. 11. The curved bottom surface 114' in accordance with this embodiment has been found to offer a compromise between load capacity and power loss which falls between those of curvature options 1 and 2.

Whilst the use of curved bottom surface has been found to be advantageous, profiling of the bottom surfaces is complex and in some applications the grooves 104, 120, 132 in the some of the bearings 30, 32, 34 in the turbocharger may be formed with a flat bottom surface 130 where this results in an acceptable load capacity and power loss.

It should also be noted that the invention in its broadest terms is not limed to use of the particular patterns of grooves disclosed herein and that other groove patterns can be used. For example, the grooves 104, 104' in the journal bearings 30, 32 need not be arranged in a herring bone pattern.

It has been found that a turbocharger takes typically around 1 to 2 seconds to ramp up to speed. The pressure of the air supply required during the aero-static phase of operation is around 3 to 5 bar (0.3 to 0.5 megapascal). By supplying pressured air to the air bearings 30, 32, 34 during the start up and slow down phases and operating the bearings exclusively or primarily as aero-dynamic bearings with no or only reduced external air supply when the turbocharger is operating at higher speeds, contactless operation of the bearings is ensured whilst reducing amount of compressed air which must be supplied in comparison with conventional aero-static bearings. The external source 36 of pressurised air may be a pump, a separate compressor, a reservoir of compressed air, or pressurised air may be taken from the compressor side of the turbocharger. Since only a relatively low pressure is required, the external source 36 of pressurised air may be smaller and lighter and use less power than the known sources used with conventional aero-static bearing systems. This makes the system particularly well suited to application on moving machines such as motor vehicles and the like.

The hybrid bearing system incorporates a control system (indicated schematically at 134) to regulate the external source 36 of pressurised air as required. The control system may be configured to sense the speed of rotation of the shaft 12 (and hence the moving parts of the air bearings), either directly or indirectly, and to regulate the supply of pressurised air from the external source 36 in dependence on the speed of rotation. In some applications, pressurised air will only be supplied from the external source 36 when the rotational speed is within certain parameters, say above 0 rpm and up to an upper threshold limit at which the aero-dynamic effect of the bearings provides sufficient air pressure in the supporting layer of air. In other circumstances it may be desirable to maintain a supply of pressurised air from the external source 36 even when the turbocharger is rotating at higher speeds when the bearing is operating aero-dynamically but to reduce the flow of the pressurised air. This increases the load capacity of the bearing whilst still enabling the external source 36 to be kept as small as possible and to reduce its power consumption.

The control system 134 may be configured to vary the flow of pressurised air from the external source 36 gradually as the speed of rotation changes or it may vary the flow as a step function or a combination of the two.

The hybrid air bearing system 28 provides very low friction support for the shaft 12 at all rotational speeds and low power loss which enables the turbocharger to respond quickly to the introduction of exhaust gasses and so reducing turbo lag. This is particularly effective when combined with the use of a ceramic turbine 10. The power consumed by the external supply of pressurised air 36 is kept as low as practically possible by relying on the external air supply 36 mainly during the start up and slow down phases and making use primarily of the aero-dynamic effect when the turbocharger is up to speed. This helps to maintain the overall efficiency of the turbocharger.

Whilst in the bearing system described above air is used as the gas for supporting the load and providing a low friction interface between the move and stationary parts of the bearings, other gases could be used. Furthermore, whilst the gas bearing system has been described for application in a turbocharger, the principles could be adopted for use in other applications.

The above embodiments are described by way of example only. Many variations are possible without departing from the scope of the invention as defined in the appended claims.

The invention claimed is:

1. A gas bearing system comprising at least one gas bearing having a moving part and a static part, the parts having opposed surfaces separated by a gap, the at least one bearing being configured to generate a layer of pressurised gas in the gap due to gas-dynamic effects in response to relative movement between the moving and static parts, the system also comprising a source of pressurised gas fluidly connected with the at least one bearing to deliver pressurised gas into the gap, and a control system for regulating the supply of pressurised gas to the at least one gas bearing in dependence on the rotational speed of the moving part, wherein at least one of the opposed surfaces is profiled to assist in the dynamic generation of a layer of pressurised gas in the gap in response to the relative movement between the opposed surfaces, and the control system is configured such that, in use, pressurised gas is supplied to the bearing only when the moving part rotates at a speed below a first threshold rotational speed.

2. A gas bearing system as claimed in claim 1, wherein the at least one gas bearing comprises at least one thrust bearing, the moving part comprising a pair of spaced rotary members and the static part comprising a plate mounted between the members so that a first gap is provided between opposed surfaces of the plate and a first of the members and a second gap is provided between opposed surfaces of the plate and the other of the members, the plate including a plurality of restrictors and flow channels for admitting pressurised gas from the source into both gaps.

3. A gas bearing system as claimed in claim 2, wherein the opposed surface of each of the rotary members has a set of grooves spaced circumferentially about a radially outer region, each groove having leading edge, a trailing edge, a radially outer edge, a radially inner edge, and a bottom surface, the radially inner edge of each groove being offset circumferentially behind the radially outer edge relative to the intended direction of rotation of the members.

4. A gas bearing system as claimed in claim 1, wherein the at least one bearing comprises at least one journal bearing, the static part comprising a tubular sleeve and the moving part comprising a journal surface of a shaft located within the sleeve, the sleeve having a plurality of restrictors for admitting pressurised gas from the source into the gap between the journal and the sleeve.

5. A gas bearing system as claimed in claim 4, wherein a plurality of grooves are spaced circumferentially about the journal surface for dynamically generating a layer of pressurised gas in the gap, the grooves each having a leading edge, a trailing edge, and a bottom surface, wherein the grooves are arranged in two rows axially spaced apart by a central land portion, each groove having an inner edge proximal to the land portion and an outer edge distal from the land portion, the inner edge being offset circumferentially behind the outer edge relative to the intended direction of rotation of the journal surface.

6. A gas bearing system as claimed in claim 5, wherein the bottom surface of at least one of the grooves is curved so that the depth of the groove varies in a direction between its leading edge and its trailing edge.

7. A gas bearing system as claimed in claim 6, wherein the bottom surface curves from the trailing edge towards the leading edge such that the groove is deeper at the leading edge than the trailing edge.

8. A gas bearing system as claimed in claim 6, wherein the bottom surface curves from the leading edge towards the trailing edge such that the groove is deeper at the trailing edge than the leading edge.

9. A gas bearing system as claimed in claim 6, wherein the bottom surface has a generally u-shaped concave curve, being deeper in a central region between the leading and trailing edges than at the leading and trailing edges.

10. A turbocharger having a housing, a turbine wheel connected with a compressor wheel by means of a shaft, and a bearing system as claimed in claim 1 supporting the shaft in the housing.

11. A turbocharger as claimed in claim 10, wherein the at least one bearing is a journal bearing in which the static part comprises a tubular sleeve and the moving part comprises a journal surface of the turbocharger shaft located within the sleeve, the sleeve having a plurality of restrictors for admitting pressurised gas from the source into the gap between the journal and the sleeve.

12. A turbocharger as claimed in claim 10, wherein the control system is configured in use to introduce pressurised gas into the gap between the moving and static part of the, or each, gas bearing during start up and slow down phases of operation of the turbocharger and to stop the flow of the pressurised gas when the turbocharger has reached normal operating speeds.

13. A hybrid static/dynamic gas bearing comprising a static part and a moving part, the static and moving parts having opposed surfaces with a gap in-between, the static part having a plurality of restrictors for introducing a pressurised gas into the gap from an external source, the opposed surface of the moving part being profiled to dynamically generate a layer of pressurised gas in the gap in response to relative movement between the opposed surfaces, wherein the opposed surface of the moving part comprises a plurality of grooves, each groove having a leading edge, a trailing edge and a bottom surface which is curved to vary the depth of the groove between the leading edge and the trailing edge.

14. A hybrid static/dynamic gas bearing as claimed in claim 13, wherein the bottom surface curves from the trailing edge towards the leading edge such that the groove is deeper at the leading edge than the trailing edge.

15. A hybrid static/dynamic gas bearing as claimed in claim 13, wherein the bottom surface curves from the leading edge towards the trailing edge such that the groove is deeper at the trailing edge than the leading edge.

16. A hybrid static/dynamic gas bearing as claimed in claim 13, wherein the bottom surface is generally u-shaped being deeper in a central region between the leading and trailing edges than at the leading and trailing edges.

17. A hybrid static/dynamic gas bearing as claimed in claim 13 wherein the bearing is a journal bearing, the static part comprising a tubular sleeve and the moving part comprising a journal surface of a shaft located within the sleeve, the sleeve having the plurality of restrictors through which pressurised gas is introduced into the gap between the journal and the sleeve.

18. A hybrid static/dynamic gas bearing as claimed in claim 13, wherein the bearing is a thrust bearing, the moving part comprising a pair of spaced rotary disc-like members and the static part comprising a plate mounted between the members so that a first gap is provided between opposed surfaces of the plate and a first of the members and a second gap is provided between opposed surfaces of the plate and the other of the members, the plate including the plurality of restrictors and flow channels through which pressurised gas from the source is introduced into both gaps.

19. A gas bearing system comprising at least one gas bearing having a moving part and a static part, the parts having opposed surfaces separated by a gap, the at least one bearing being configured to generate a layer of pressurised gas in the gap due to gas-dynamic effects in response to relative movement between the moving and static parts, the system also comprising a source of pressurised gas fluidly connected with the at least one bearing to deliver pressurised gas into the gap, and a control system for regulating the supply of pressurised gas to the at least one gas bearing in dependence on the rotational speed of the moving part, wherein the at least one bearing comprises at least one journal bearing, the static part comprising a tubular sleeve and the moving part comprising a journal surface of a shaft located within the sleeve, the sleeve having a plurality of restrictors for admitting pressurised gas from the source into the gap between the journal and the sleeve, and wherein a plurality of grooves are spaced circumferentially about the journal surface for dynamically generating a layer of pressurised gas in the gap, the grooves each having a leading edge, a trailing edge, and a bottom surface, the grooves being arranged in two rows axially spaced apart by a central land portion, each groove having an inner edge proximal to the land portion and an outer edge distal from the land portion, the inner edge being offset circumferentially behind the outer edge relative to the intended direction of rotation of the journal surface.

20. A gas bearing system comprising at least one gas bearing having a moving part and a static part, the parts having opposed surfaces separated by a gap, the at least one bearing being configured to generate a layer of pressurised gas in the gap due to gas-dynamic effects in response to relative movement between the moving and static parts, the system also comprising a source of pressurised gas fluidly connected with the at least one bearing to deliver pressurised gas into the gap, and a control system for regulating the supply of pressurised gas to the at least one gas bearing in dependence on the rotational speed of the moving part, wherein the at least one gas bearing comprises at least one thrust bearing, the moving part comprising a pair of spaced rotary members and the static part comprising a plate mounted between the members so that a first gap is provided between opposed surfaces of the plate and a first of the members and a second gap is provided between opposed surfaces of the plate and the other of the members, the plate including a plurality of restrictors and flow channels for admitting pressurised gas from the source into both gaps, the opposed surface of each of the rotary members having a set of grooves spaced circumferentially about a radially outer region, each groove having leading edge, a trailing edge, a radially outer edge, a radially inner edge, and a bottom surface, the radially inner edge of each groove being offset circumferentially behind the radially outer edge relative to the intended direction of rotation of the members.

* * * * *